United States Patent [19]

Keskes

[11] Patent Number: 5,148,494
[45] Date of Patent: Sep. 15, 1992

[54] PROCESS FOR AUTOMATIC PLOTTING AND ASSISTANCE INTERPRETATION OF SEISMIC CROSS-SECTIONS IN PARTICULAR USING IMAGE ANALYSIS TECHNIQUES

[75] Inventor: Naamen Keskes, Lons, France

[73] Assignee: Societe Nationale Elf Aquitaine, Courbevoie, France

[21] Appl. No.: 623,727
[22] PCT Filed: Apr. 26, 1990
[86] PCT No.: PCT/FR90/00303
 § 371 Date: Feb. 28, 1991
 § 102(e) Date: Feb. 28, 1991
[87] PCT Pub. No.: WO90/13831
 PCT Pub. Date: Nov. 15, 1990

[30] Foreign Application Priority Data

Apr. 28, 1989 [FR] France .............................. 89 05741

[51] Int. Cl.$^5$ .............................................. G06K 9/00
[52] U.S. Cl. .......................................... 382/1; 382/16; 382/21; 364/421
[58] Field of Search ........................ 364/421; 358/107; 382/1, 16, 21; 367/68

[56] References Cited

U.S. PATENT DOCUMENTS

| | | | |
|---|---|---|---|
| 4,633,400 | 12/1986 | Chittineni | 382/21 |
| 4,782,446 | 11/1988 | Ehler et al. | 364/421 |
| 4,841,444 | 6/1989 | Chittineni | 382/16 |
| 4,992,995 | 2/1991 | Favret | 364/421 |

Primary Examiner—Jose L. Couso

[57] ABSTRACT

The process for analyzing a two-dimensional seismic cross-section image, including traces of a seismic cross-section, including processing the two-dimensional seismic cross-section with a binary function, a first value being assigned if a slope of the amplitude of the trace is positive, and a second value being assigned with a slope of the amplitude of the trace is negative, applying edge following techniques to the binarized image in order to determine contours of areas to be associated based on the first and second values, breaking down each of the contours into a series of chains, limited by turning points situated on each of the contours at a location where a direction changes from left to right or from right to left, when the contour is described in a given direction of rotation, breaking down each chain into contiguous curved segments such that a greatest distance between one point of each contiguous curved segment and a straight line segment joining the two ends the contiguous curved segement does not exceed a predetermined value, allocating to the contiguous curve segments at least one range, characterizing all the values of a parameter associated with the contiguous curved segments, and displaying all the contiguous curved segments for which at least one of the ranges belongs to a predetermined interval.

12 Claims, 7 Drawing Sheets

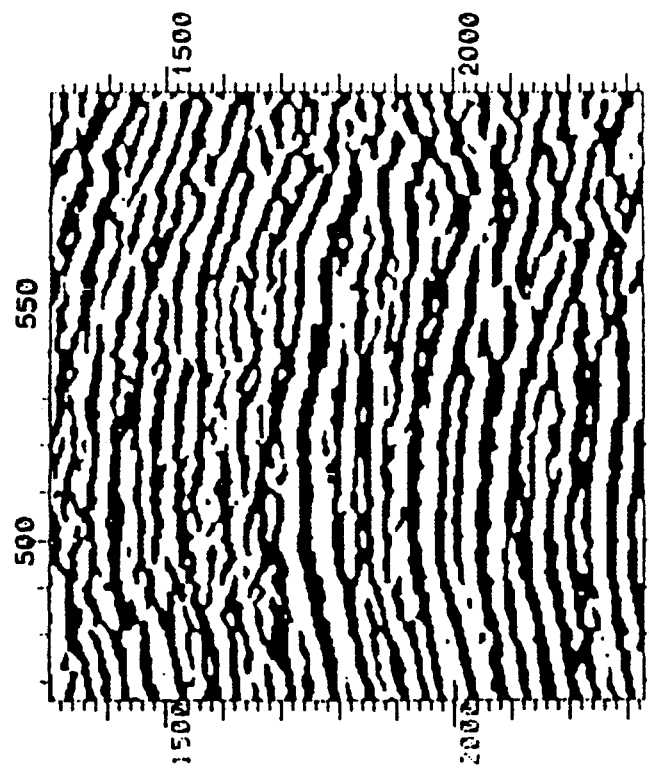
FIG._1
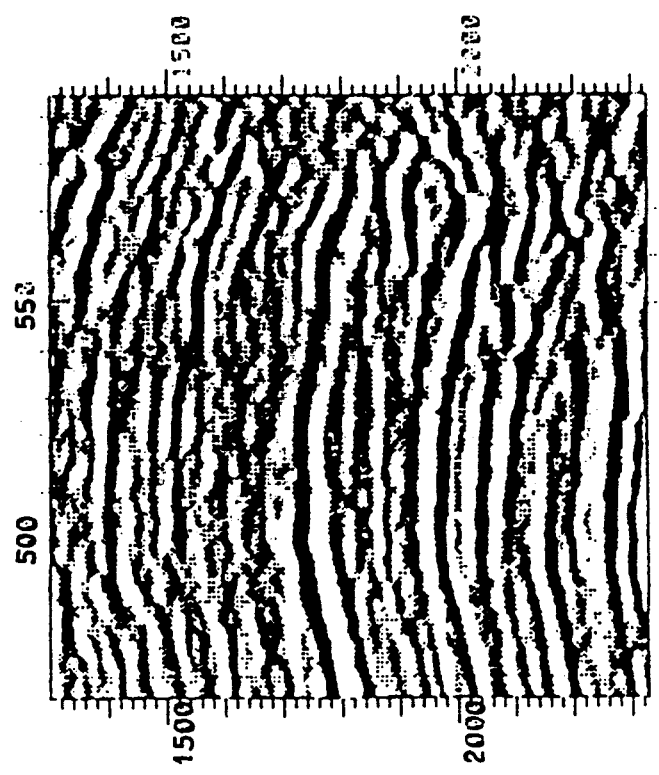
FIG._2

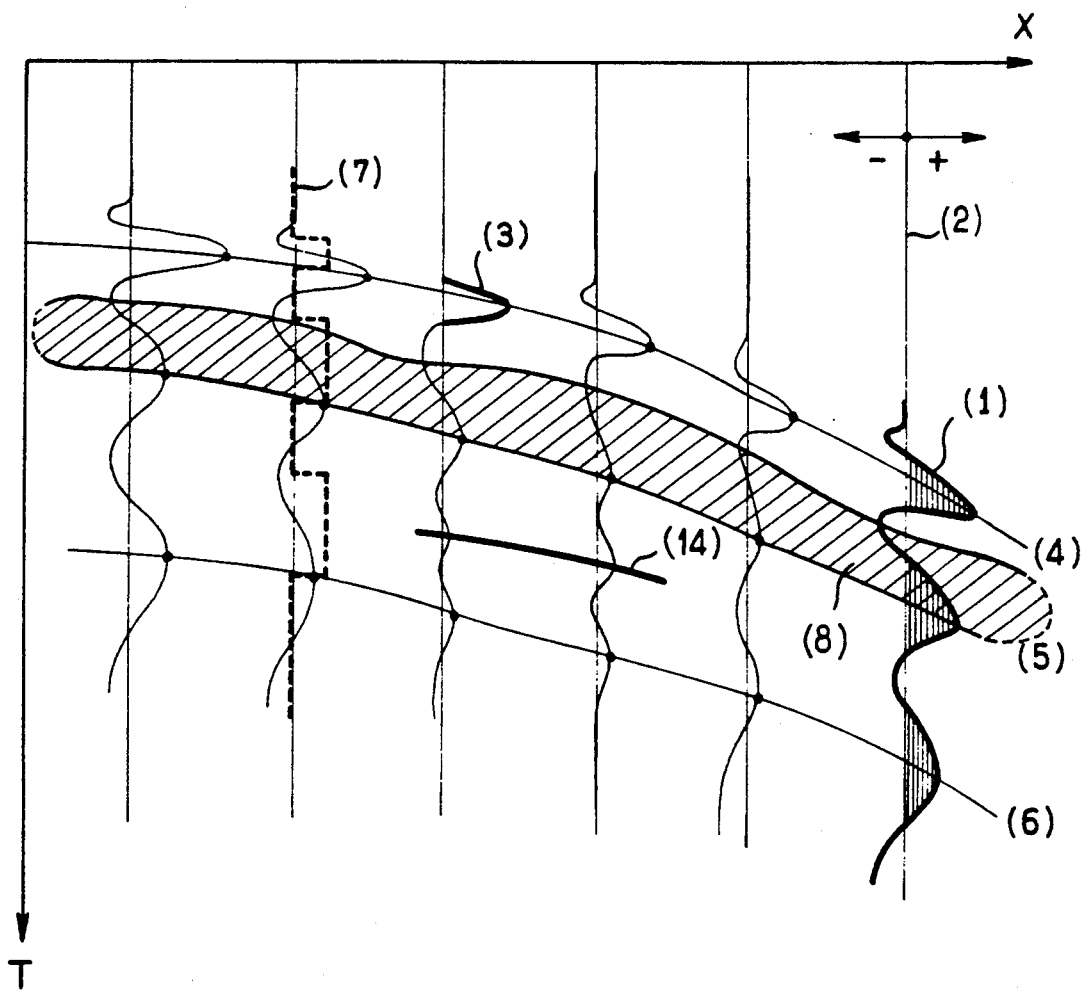
FIG_6

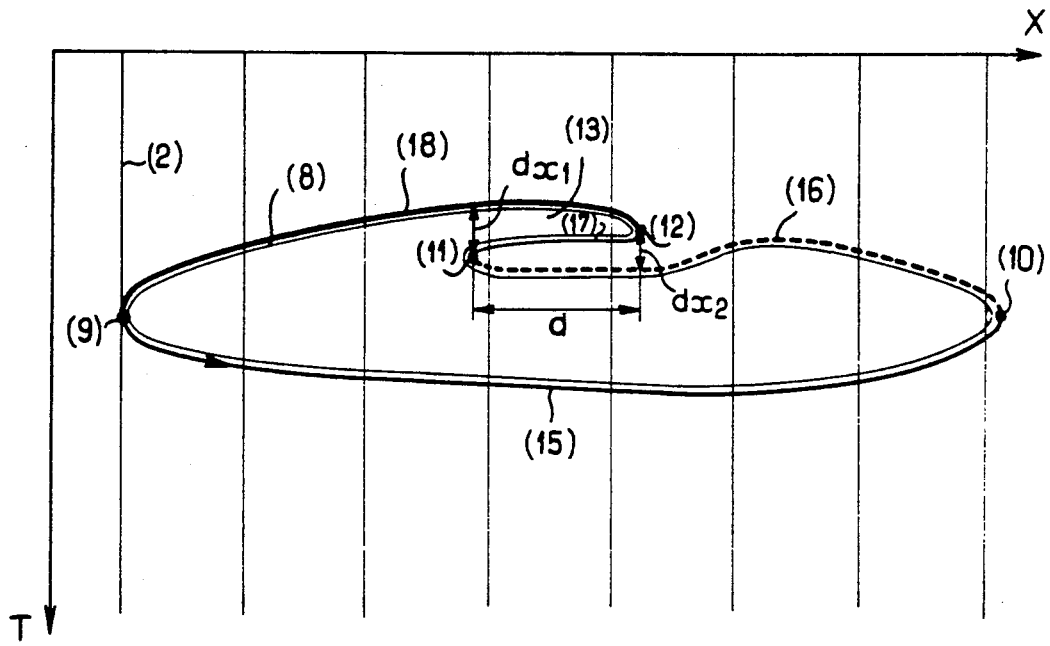
FIG_7A
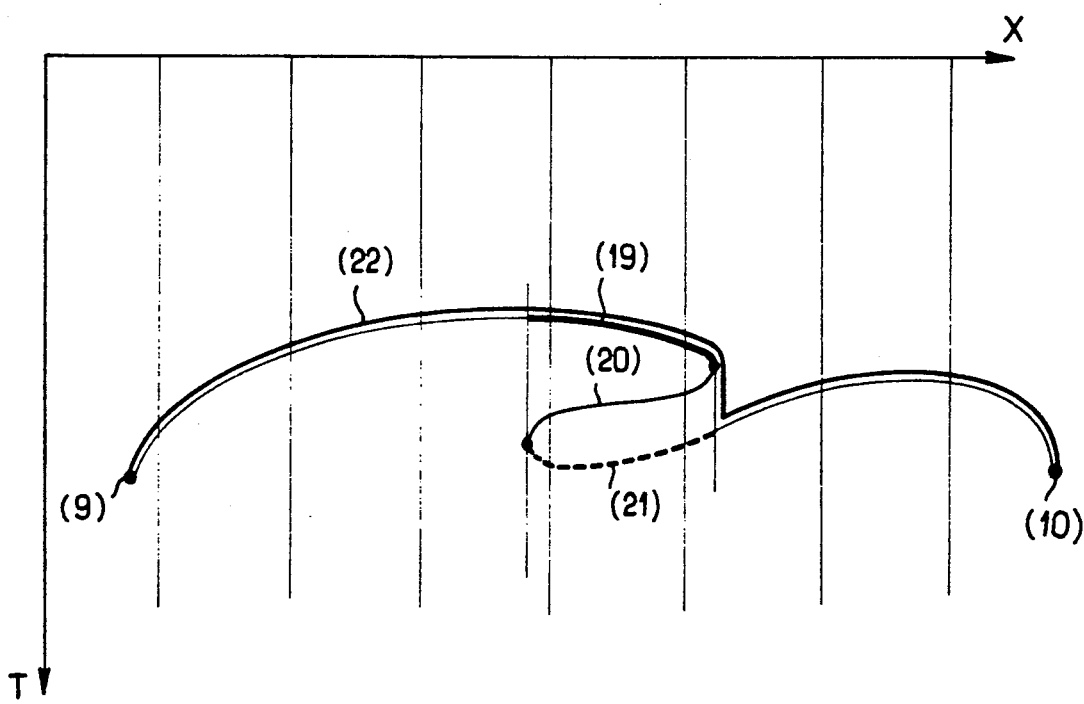
FIG_7B

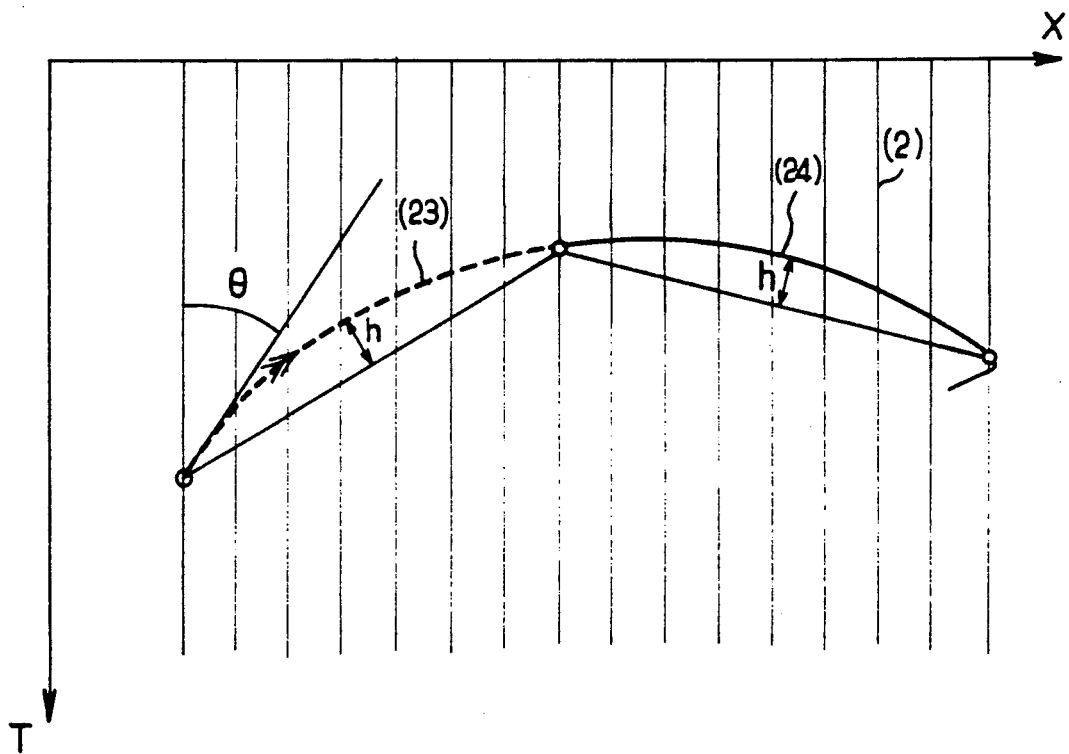
FIG_7C

PROCESS FOR AUTOMATIC PLOTTING AND ASSISTANCE INTERPRETATION OF SEISMIC CROSS-SECTIONS IN PARTICULAR USING IMAGE ANALYSIS TECHNIQUES

The present invention relates to a plotting process which is particularly suitable for images wherein a direction is preferred, such as the image of a seismic cross-section. When applied to seismology, the process according to the invention in particular enables the portions of seismic horizons of the seismic cross-section having given features to be automatically selected and this cross-section to be interpreted structurally and stratigraphically.

In a very general manner, it may be considered that the substratum consists of an arrangement of geological layers having different features and organised in space according to a given geometry.

In order to define the geometry of the substratum, specialists in substratum exploration, in particular petroleum exploration, use a special technique known as "seismic reflection" which includes emitting acoustic signals on the surface of the ground and recording them after the signals have been propagated through the substratum and have been reflected on particular acoustic borders which are formed at the boundaries of (adjacent) geological layers and are known as reflectors.

The recorded signals are processed so as to obtain particular images of the substratum, known as "seismic cross-sections" which may be assimilated with vertical cross-sectional plans of the substratum and on which the reflectors appear as lineations superimposed over one another, relatively distinguishable, relatively continuous, and are subhorizontal or deformed, with respect to the image of the substratum layers and referred to by specialists as "seismic horizons".

A seismic cross-section consists of a succession, from left to right or from right to left of vertical recordings known as "seismic traces" consisting of signals which have an amplitude which is relatively high and include positive and negative arches, each of these signals being the image of a point of a reflector. The image signals of a given reflector correlate from one trace to another, thus rendering lineations visible.

Certain of these lineations may be very short but, nevertheless, have importance: this is the case with "doublets" for example. It is said that doublets are present on a seismic cross-section when an arch of a frequency signal which is higher and of the same sign as the arches constituting the major lineations is intercalated between two clearly distinguished major lineations which are associated with amplitude arches of the same sign and separated over a great length by a single signal arch having an opposite sign.

Seismic cross-sections prepared by geophysicists are subsequently transmitted to specialists—geophysicists or geologists—who interpret them in order to detect for example reservoirs therein. The interpretation process includes plotting a given number of determined seismic horizons over a plurality of seismic cross-sections describing a given geographical area which may intersect one another, and producing a map therefrom. The plotting operation is conventionally performed by hand. The plotting includes connecting the signals which are considered to belong to a given seismic horizon by optical correlation therebetween, using a coloured crayon. Usually different horizons will be plotted with different colours in order to differentiate them. The image signals of a given reflector will have features—shape, frequency content, number of arches, amplitude, etc.—which are generally similar.

Undoubtedly, a plotting system of this type is a long, tedious and hence costly process. It is not uncommon for one interpretation operation to occupy several interpreters for a number of weeks when a large number of horizons must be plotted over a large number of cross-sections.

This is the case, for example, when reconnaissance exploration is carried out over a very wide geographical area or when "deposit seismology" is performed over a limited area but with very close cross-sections. This manual work may, moreover and consequently, lead to plotting errors which are all the easier to make when the horizons to be plotted are not clearly differentiated and when the geology of the area in question is much disturbed. In particular, the presence of faults may interrupt a reflector and confuse the interpreter who may correlate two lineations of signals on either side of the fault which should not be associated with the same reflector.

The interpreter of seismic documents is therefore faced with a large amount of data fixed on a representation from which information must be extracted visually. A large portion of this work is lengthy, complicated and remains highly subjective, depending both on the quality of the representation and the ability of the interpreter.

Viewing by computer has enabled progress to be made in recent years such that it is now possible to use computers not only as a means of display and storage but also as a means of analysing images.

A seismic cross-section may be considered as a two dimensional image with two parameters $I(k, l)$ wherein the parameter k shows the time or the depth on the y-axis and parameter 1 shows, on the x-axis, the number of the seismic trace, I being the amplitude which is a function of the value of the coefficient of reflection at the reflector.

If it is assumed that the amplitude I is represented by different shades of grey, the detection of the seismic horizon could in theory lead to a problem of detecting edges or "contouring". This approach encounters a global problem, however: seismic images are extremely susceptible to noise and conventional image processing methods prove to be highly unsuitable for the analysis thereof. Thus the results obtained after the conventional contour detecting methods or "extrema plotting" have been carried out are very deceptive. This latter technique, which is conventionally used in processing geophysical data, for example in determining lines of slope, includes finding the maximum associated with the time closest to a time To by plotting an amplitude maximum on a trace characterised by To, and so on from trace to trace. This method, which is highly sensitive to sound, furthermore requires numerous thresholds to be provided by the interpreter.

Taking account of given features peculiar to the image of a seismic cross-section, such as ambient noise or even the unidirectional nature provided thereby, enables a two-dimensional image analysis process representing values assumed by one parameter along two axes to be elaborated, the values being arranged according to lineations particularly suited to the images on which the the lineations are preferably distributed along one of the axes, and enabling the areas in which the lineations have similar features to be determined.

The process according to the invention is characterised in that:

firstly the lineations provided by the image are plotted;

subsequently each of these lineations is broken down into contiguous curved segments such that the greatest distance between one point of this segment and the straight line segment joining the two ends thereof does not exceed a given limited distance;

at least one range characterising all the values of the parameter associated with the segment is subsequently allocated to each of these segments;

finally all the segments for which at least one of the ranges belongs to the same predetermined interval are displayed.

In another preferred embodiment, there are calculated and allocated to each of the alignments including the association of contiguous segments which are associated with at least one range belonging to the same interval, parameters characterising the latter in order to display all the alignments for which at least one of the parameters associated with the alignment belongs to a given area defined by the user.

This process finds a particular application in the structural and stratigraphical analysis of a seismic image or a cross-section for which the information—in this case the image of seismic horizons—is preferably distributed along the horizontal, and in particular enables all the seismic horizons of a cross-section to be plotted automatically and the geological assemblies having similar features to be delimited. The process according to the invention, adapted to seismology is characterised:

firstly in that, in order to plot horizons, an "edge following" technique is applied to the image of the seismic cross-section after which the latter is said to have been binarised, the binarisation includes replacing each of the traces by a binary function which can only assume two values, the first of these values being assumed if the slope of the amplitude of the trace is positive, the second value being assumed if the slope of the amplitude is negative. This technique enables the contours of areas associated with one or other value to be determined;

subsequently, each of the contours is broken down into a series of chains limited by turning points which are contour points situated at the location where the direction changes from left to right or from right to left when the contour is described in a given direction, wherein the chains represent the image of seismic horizons;

and further, before being broken down into chains, the contours having folds each characterised by two adjacent turning points, in addition to the two turning points present over the entire contour, are converted into a single contour with two turning points only and a number—which is a multiple of two—of isolated chains, in order to take account of the anomalies which may be considered as the image of seismic doublets on the contours.

Finally, for its application to seismology, the characteristic parameters attributed to the segments and alignments are at least: a line of slope, for example corresponding to the angle formed by the straight line joining the two ends of the segment or of the alignment with a vertical reference axis, an amplitude corresponding to the average of the optimum amplitudes along the portion of the reflector associated with the segment of the alignment, an amplitude variance which corresponds to the variance over all the optimum amplitudes along the portion of the reflector, the length corresponding to the number of points of the segment or the alignment, and a pseudo-period.

According to other embodiments, the image obtained after contouring may be filtered in order to eliminate elements having too small a surface area, for example which do not extend over more than two traces.

The process, of course, provides good results on seismic images but it has also been successfully applied to other types of images, for example to VLSI (Very Large Scale Integration) images, natural scenes such as satellite images, SPOT, LANDSAT and to the reconnaissance of industrial areas.

One advantage of the present invention, in particular as applied to seismology, resides in the fact that, apart from the obvious time and cost savings, it enables reliable information associated with the seismic information to be extracted from the seismic image. By way of example, with respect to the time saving, a manual interpretation taking two months may be reduced to a processing operation taking a few days or even a few hours using this process.

Further advantages and features will appear from the following description of an embodiment of the present invention, with reference to the attached drawings, wherein:

FIG. 1 shows the image of a seismic cross-section;

FIG. 2 shows the binarised image of FIG. 1;

FIG. 6 illustrates what given terms used mean on a zoom projection of an imaginary cross-section;

FIGS. 7A, 7B and 7C show the steps followed for the processing of doublets with respect to an imaginary example.

Figure 3:
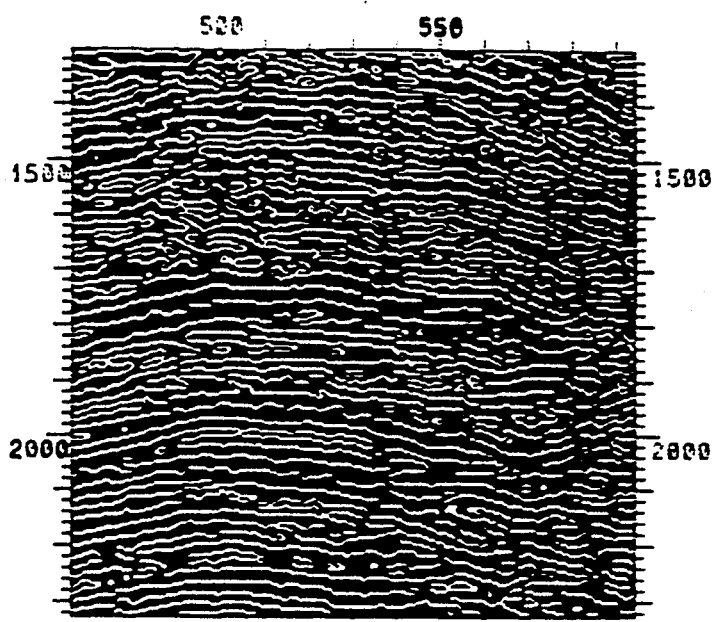
FIG. 3 shows the image of FIG. 2 after a contouring technique has been applied.

The seismic cross-section illustrated in FIG. 1 was obtained by the exploration technique known as "seismic reflection" of which the principle is described above. Extensive literature exists on this subject and reference may be made thereto in order to discover the manner in which a seismic cross-section is produced. Most frequently, as is the case with FIG. 1, and as shown in detail in FIG. 6, a seismic cross-section includes the juxtaposition of individual recordings of variable amplitude, called traces (1).

The most frequent illustration of these traces, such as the one illustrated on the trace which is furthest to the right in FIG. 6, includes representing the positive amplitude signal arches in black and the negative amplitude signal arches in white, it being impossible to illustrate the reference axis (2) of the zero amplitudes. The traces forming part of the seismic cross-section are labelled in a plane of which the X-axis represents distances X and Y-axis represents the times T or depth P.

The seismic cross-section image shown in FIG. 1 includes pixel columns each representing a trace of the cross-section, a coding in shades of grey enabling the amplitude of the trace to be assessed, the black being associated with high amplitudes and the white being associated with low amplitudes.

The human eye can discern in a seismic cross-section assemblies of coherent arches constituting the seismic horizons. It is the coherences which are sought. Each of these arches may be approximated by its local extremum which provides good localisation of the arch and its amplitude in time. These local extrema may be connected under given restrictions selected by the interpreter, in order to form chains which are capable of representing a seismic horizon portion.

FIG. 6 shows by way of example three chains of local maxima (4), (5), (6). The local extremum may also be considered as the place at which the amplitude slope of the signal changes sign. The first stage of the process according to the invention applied to seismology includes replacing the trace by a stepped function such as function (7) in FIG. 6, assuming the value 1 over the time ranges for which the amplitude slope is positive and the value 0 over the ranges where the slope is negative. In this way the cross-section is "binarised" trace by trace, finally resulting in a representation similar to that shown in FIG. 2, clearly showing white "objects", the object being an assembly of value 1 surrounded by zeroes, and black "holes", the hole being an assembly of value 0 surrounded by 1s. In the particular case shown, the objects are associated with the positive slopes and the holes are associated with the negative slopes. If the y-axis is followed in the upward direction, each passage from white to black corresponds to a local maximum and each passage from black to white corresponds to a local minimum.

It may be advantageous to apply to this image a morphological filter in order to eliminate uniform surfaces having small dimensions and extending, for example, over one or two traces and which can only be the translation of the presence of noise.

Subsequently there is applied to the binarised image a conventional technique for processing "edge following" images, also known as "contouring" programs, such as the contouring algorithms of Pavlides or Rosendfeld or, further, the "edge coupling" method developed by N. Keskes, the inventor, in his thesis, enabling the limits or contours of areas associated with the same value to be delimited. A contour (8) of this type is shown schematically in FIG. 6.

On each of these closed contours defined in this way it is possible to determine a given number of particular points, the number of which is at least two for single contours which are not intersected by a cross-section edge. These points are situated at direction-changing locations—from left to right or from right to left in our example—when the contour is described in a given rotational direction, such as points (9) and (10) in FIG. 7A, and are known as turning points.

From a given turning point, following a contour in a particular rotational direction (clockwise or anti-clockwise) enables the object to be described, while following it in the opposite direction enables the hole to be described. The direction of rotation and the direction of movement (right to left or left to right) make it possible to distinguish whether the border followed is associated with an amplitude maximum or with a minimum without any ambiguity.

Contours such as the contour illustrated schematically in FIG. 7A have more than two turning points. In the application of the process according to the invention to seismology, they are to be processed in a particular manner since these additional turning points translate the presence of contour folds (13) which may be indicative of phenomena known as "doublets" in seismic reflection.

These doublets (14) may be associated with phenomena which are important from the point of view of interpretation: for example the presence of a bed of carbonates, oil or gas, and it is important that they be carefully processed.

In the process according to the invention, each of the folds present in the binarised cross-section is characterised by a given number of parameters, which are:

the distances $dx1$ and $dx2$ existing respectively between each of the two turning points belonging to the fold and the point closest to the contour to which the fold belongs and which is likewise located on the vertical passing through the turning point;

the horizontal distance d separating the two vertical lines passing through the two turning points associated with the same fold, and which is defined by the size of the fold;

possibly, the distance D (not illustrated in the Figures) which separates one fold from the following fold encountered when describing the contour in particular directions of rotation and direction, if there is one.

Accounting for the fold as a doublet image is performed, if necessary, during the phase when each of the contours is broken down into "chains". A "chain" is all the local maxima or minima associated with the part of the contour included between two turning points. If the contour in question is that of an object without folds (with the conventional signs and values given hitherto as examples) comprising only two turning points, it will include two chains, one upper chain associated with local minima and one lower chain associated with local maxima.

Before the doublets are processed, the contour comprising a fold includes four chains, such as chains (15), (16), (17) and (18) in FIG. 7A. The processing of the doublets includes validating or invalidating the turning points of the fold as the chain ends. If the fold is not considered as the image of a doublet, the chain is broken at the fold and two chains such as chains (18) and (16) in FIG. 7A will be taken independently for the further stages of the process. If the fold is considered to be the image of a doublet, the chain is not interrupted at the fold but the trace thereof is modified, however; as is shown in FIG. 7B, it is possible to define for each fold three contour portions which are superimposed between the verticals passing through the two turning points characterising the same, i.e. the upper contour portion (19) defined by the shortest times and forming part of the upper chain (18), the lower contour portion (21) defined by the longest times and forming part of the lower contour chain (16), and the centre contour portion (20) comprised between the two afore-mentioned portions and superimposed on the entire chain.

If a fold exists, it is considered, on the one hand, as a major chain (22), which is the result of combining the upper chain (18), of which the upper contour portion (19) forms part, with the part of the lower chain which does not comprise the lower contour portion, and, on the other hand, two single chains, of which one includes the centre contour portion (20) and the other includes the lower contour portion (21).

The criteria for selecting the doublet are focused on parameters $dx1$, $dx2$ and D. In the embodiment described, a fold characterised by these four parameters is considered to be the image of a doublet if at least one of the distances dx1 and dx2 is less than a threshold fixed by the interpreter as a function of the frequency content of the seismic cross-section—for example on the order of 16 ms for a seismic cross-section obtained between 10 and 80 Hz—and if the length d is less than a suitable distance which is a function of the distance D separating the processed doublet from the following doublet, for example half the distance D.

All the upper or lower folds of the same contour are processed in succession, in increasing order of size, the distance D being recalculated after each doublet-processing step.

When all the contours have been broken down into chains, each chain is subsequently broken down into segments, one segment being a portion of a chain such that no point of the segment is further from the straight line connecting the two ends thereof than a value h, h being a threshold fixed by the interpreter, on the order of a few milliseconds.

The reason for this break down is that it is impossible to ensure that a chain belongs to a single seismic horizon and it is important to define the uniform horizon portions, bearing in mind that the points at which uniformity breaks down are located at the points where the chains curve greatly.

In order to perform this process, which may be considered as a polygonal approximation, conventional processing algorithms exist, such as the Pavlides algorithm, providing a result which is independent of the direction in which the chain is described.

Figure 8:
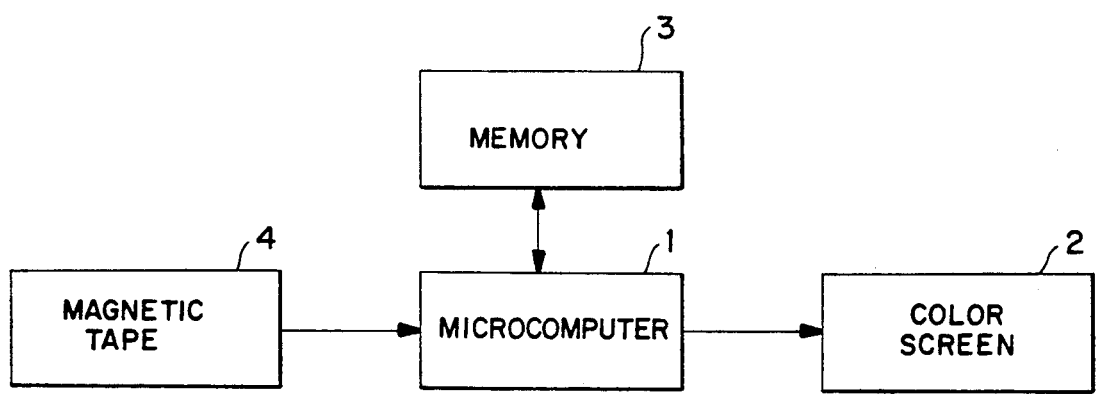
FIG. 8 is a block diagram of the hardware used to perform the process of the present application.

Advantageously, in the process according to the invention, in particular in the application thereof to seismology, the selection and display of the selection is performed automatically using a microcomputer 1 and a coloured screen 2, as shown in FIG. 8 on which the cross-section and results of the various stages of the process are displayed interactively. Each segment is labelled in the machine memory 3 and a given number of parameters characterising the arches of the seismic horizon part associated therewith are calculated and memorised. These parameters are, for example:

a length corresponding to the number of traces intercepted by the segment;

a local line of slope corresponding to the angle formed by the vertical axis of the cross-section and the straight line segment joining the two ends of the segment;

an amplitude, which is one of the most noticeable parameters on a seismic cross-section is accounted for in the form of an average of the optimum amplitudes of the arches along the segment, and of the associated type difference;

a pseudo average period along the segment and the associated type difference.

In two dimensions, the mere existence of the segments enables the interpreter to display the seismic elements existing in his image. The process according to the invention enables the interpreter, after reading a magnetic tape 4 and a few minutes' calculation, to observe the influence and distribution of the parameters such as amplitude, continuity, line of slope, frequency, etc.

Figure 4:
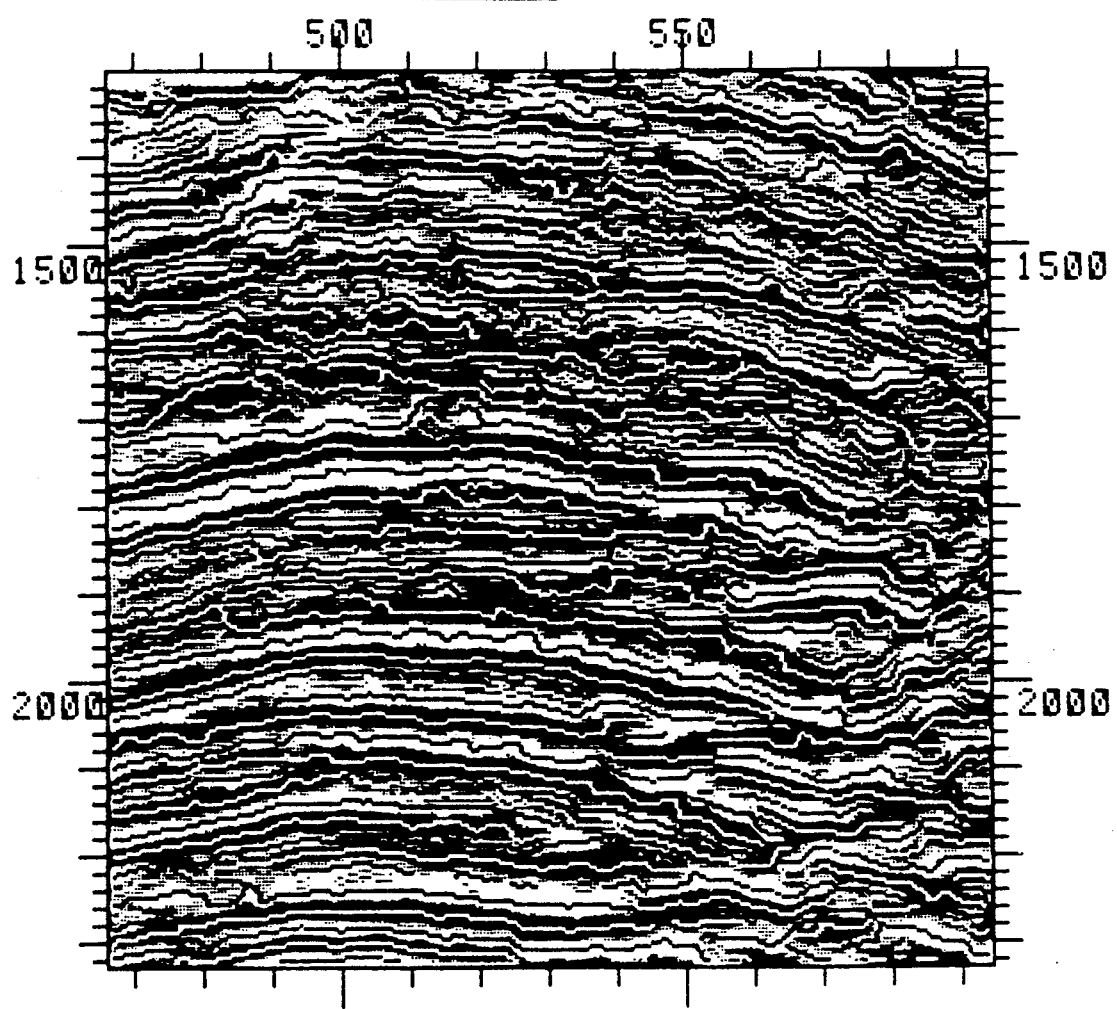
FIG. 4 shows the superimposition of the result of the automatic plotting of the local extrema and the initial image of FIG. 1.

He is able to display all the chains in order to obtain an image similar to that of FIG. 3 or to display them superimposed on the seismic cross-section in order to obtain an image similar to the image shown in FIG. 4.

Figure 5:
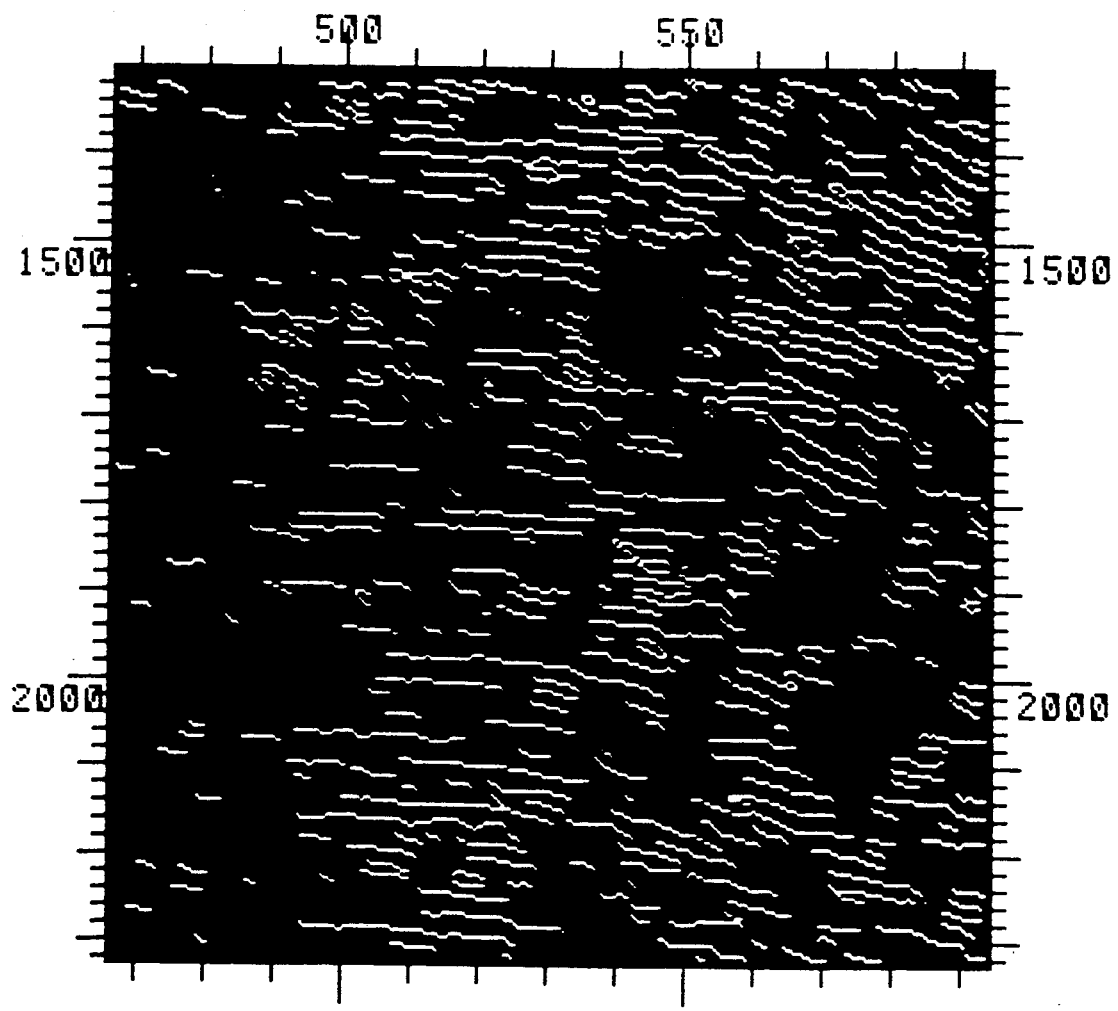
FIG. 5 shows the alignment selection associated with a negative line of slope.

The breakdown into segments and the calculation of the parameters characterising each of the segments enables the interpreter to select, in his seismic image, all the segments which have similar features and thus to display uniform seismic assemblies. The selection is made as a function of distance criteria based on the calculated parameters, requiring the interpreter to input thresholds and limits. FIG. 5 shows by way of example the selection of the segments of the cross-section of FIG. 1 characterised by a positive line of slope. Some of the alignments visible on this FIG. 5 are the result of the juxtaposition of various adjacent segments satisfying the same criteria. These alignments constitute uniform assemblies of local extrema forming part of a given horizon.

The characteristic parameters, such as length, average amplitude, amplitude variance, obvious frequency or average pseudo-period on the alignments which are already the result of a first-rate selection may be recalculated.

The selection criteria may be more sophisticated and focus on several parameters simultaneously. The interpreter may thus select the segment assemblies (thus seismic horizon parts) characterised by an amplitude forming part of certain section of given values and by variations in lines of slope, between adjacent segments which do not exceed a different given value.

The colour coding enables the perception of the stratigraphy of the geological medium in question and the features thereof to be improved. For example it enables all the seismic chains and different classes of amplitudes defined by the interpreter to be represented, each of the alignment assemblies belonging to a given class appearing in a particular colour, it being possible for one chain to include several alignments belonging to different classes.

The colour may also assist in the perception of a parameter additional to that on which the selection was based: the representation of the alignments coded in different colours according to the length thereof may be useful, for example. In this case one particular colour alone is associated with each alignment.

In practice, from the beginning of the first phase of the process, the contours are very elongated, some of them crossing the entire width of the cross-section and very frequently including the combination of only two or three alignments, as a function of the criterion or criteria selected at least for clearly distinguished horizons of high amplitudes.

The continuity of horizon plotting systems may be further improved by combining the alignments which are located—in a spatial context of continuous horizons—in the extensions of one another and of which the ends are only separated by two or three traces, for example.

The description of which details are given above and which focuses on the application of the process according to the invention for the analysis of seismic cross-sections does not restrict the invention to this application alone. Numerous variants are accessible to the person skilled in the art, according to the applications envisaged, without departing from the scope of the invention.

The process according to the invention has, for example, been successfully adapted to areas other than geophysics and has been used for counting cells, the simple detection of contours, studying the skin network, etc.

If the information is distributed in a direction which is closer to the horizontal than to the vertical, the process is carried out in columns and if the information is distributed in a direction which is closer to the vertical than the horizontal, the process is performed from line to line.

I claim:

1. A process for plotting lineations and for identifying areas of the lineations with similar features of two-dimensional images representing values which are measured by a parameter along two axes and are organized along the lineations, to facilitate analysis of the two-dimensional images, comprising the steps of:
   (a) reading said values from magnetic media to obtain the two dimensional images containing the organized lineations and plotting the lineations;
   (b) breaking down each plotted lineation into contiguous curved segments utilizing a microcomputer, including a central processing unit, such that a greatest distance between one point of each of the contiguous curved segments and a straight line segment joining the two ends thereof does not exceed a predetermined value and storing the contiguous curved segments in a memory;
   (c) allocating to each of the contiguous curved segments at least one range, characterizing all the values of the parameter associated with each of the contiguous curved segments; and
   (d) displaying all the contiguous curved segments for which at least one of the ranges belongs to a given predetermined interval for the two-dimensional images, on a screen in order to facilitate analysis of the two-dimensional images.

2. The process of claim 1, wherein the plotted lineations are all maxima and minima of said values.

3. The process of claim 1, further comprising the steps of:
   (e) defining an alignment at each junction of two or more of the contiguous curved segments with at least one range belonging to a common interval;
   (f) calculating additional parameters which characterize each alignment; and
   (g) displaying all alignments for which at least one of the parameters associated with each alignment forms part of a predetermined area defined by a user.

4. The process of claim 1, wherein the analyzed images are those on which the lineations are distributed along one of the axes.

5. A process for plotting lineations and for identifying areas of the lineations with similar features of a two-dimensional seismic cross-section image, including traces of a seismic cross-section, representing values measured by a parameter along two axes, said values being organized along the lineations to facilitate analysis of the two-dimensional seismic cross-section image comprising the steps of:
   (a) reading said values from magnetic media to obtain the two-dimensional seismic cross-section image including the seismic cross-section traces;
   (b) binarizing the two-dimensional seismic cross-section utilizing a microcomputer including a central processing unit by processing each of the traces with a binary function which can only assume two values, the first of the values being assumed if the slope of the amplitude of the trace is positive, the second value being assumed if the slope of the amplitude of the trace is negative;
   (c) applying edge following techniques to the binarized image of the two-dimensional seismic cross-section, for determining contours of areas to be associated based on the first and second values;
   (d) breaking down each of the contours into a series of chains, limited by turning points situated in each of the contours at a location where a direction changes from left to right or from right to left when the contour is described in a given direction of rotation;
   (e) breaking down each chain into contiguous curved segments such that a greatest distance between one point of each contiguous curved segments and a straight line segment joining the two ends of each of the contiguous curved segments does not exceed a predetermined value and storing the contiguous curved segments in a memory;
   (f) allocating to the contiguous curved segments at least one range, characterizing all the values of the parameter associated with the contiguous curved segments; and
   (g) displaying all the contiguous curved segments for which at least one of the ranges belongs to a predetermined interval for two dimensional seismic cross-section image on a display screen in order to facilitate analysis of the two-dimensional seismic cross-section image.

6. The process of claim 5, further comprising the steps of:
   (h) defining an alignment at each junction of two or more of the contiguous curved sigments with at least one range belonging to a common interval;
   (i) calculating additional parameters which characterize each alignment; and
   (j) displaying all alignments for which at least one of the parameters associated with each alignment forms part of a predetermined area defined by a user.

7. The process of claim 5, wherein prior to step (d), contours having folds, each characterized by two adjacent turning points, in addition to the two turning points present over the contour, are converted into a single contour with only two turning points and predetermined number, which is a multiple of two, of isolated chains.

8. The process of claim 5, wherein the parameter which characterize each contiguous curved segment is selected from the group consisting of a line of slope, an amplitude, and amplitude variance, a length and pseudo-period.

9. The process of claim 6, wherein the additional parameters which characterize each alignment are selected from the group consisting of a line of slope, an amplitude, an amplitude variance, a length and a pseudo-period.

10. A process for automatically plotting all seismic horizons on an image of a seismic cross-section, said image including columns each representing traces of the cross-section, to facilitate analysis of the seismic cross-section, comprising the steps of:
   (a) reading the seismic cross-section from magnetic media to obtain the seismic cross-section image including the seismic cross-section traces;
   (b) binarizing the image of the seismic cross-section utilizing a microcomputer including a central processing unit by processing each of the traces with a binary function which can only assume two values, the first of these values being assumed if a slope of an amplitude of the trace is positive, the second value being assumed if the slope of the amplitude of the trace is negative;

(c) applying edge following techniques to the binarized image of the two-dimensional seismic cross-section, for determining contours of areas to be associated based on the first and second values;

(d) breaking down each of the contours into a series of chains limited by turning points situated on each of the contours at a location where a direction changes from left to right or from right to left when the contour is described in a given direction of rotation and storing the series of chains in a memory; and (e) displaying the series of chains on a screen in order to facilitate analysis of the seismic cross-section.

11. The process of claim 10, wherein, before step (c) contours having folds, each characterized by two adjacent turning points, in addition to the two turning points present over the contour, are converted into a single contour with only two turning points and a predetermined number, which is a multiple of two, of isolated chains.

12. The process of claim 10, further comprising the step of:

(f) plotting the series of chains on a plotter.

* * * * *

UNITED STATES PATENT AND TRADEMARK OFFICE
CERTIFICATE OF CORRECTION

PATENT NO. : 5,148,494
DATED : September 15, 1992
INVENTOR(S) : Naamen Keskes

It is certified that error appears in the above-indentified patent and that said Letters Patent is hereby corrected as shown below:

On the Title page, item [73], change Assignee to --SOCIETE NATIONALE ELF

AQUITAINE (PRODUCTION)--.

Signed and Sealed this

Nineteenth Day of October, 1993

Attest:

BRUCE LEHMAN

*Attesting Officer*     *Commissioner of Patents and Trademarks*